(12) United States Patent
Thanasiu et al.

(10) Patent No.: US 8,499,546 B2
(45) Date of Patent: Aug. 6, 2013

(54) METHODS FOR REDUCING ENGINE EXHAUST EMISSIONS

(75) Inventors: Eva Thanasiu, Trenton, MI (US); Carolyn Parks Hubbard, Dearborn Heights, MI (US); Shane Elwart, Washtenaw, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 679 days.

(21) Appl. No.: 12/201,564

(22) Filed: Aug. 29, 2008

(65) Prior Publication Data

US 2010/0050605 A1    Mar. 4, 2010

(51) Int. Cl.
    *F01N 3/20*    (2006.01)

(52) U.S. Cl.
    USPC .................. 60/284; 60/274; 60/285

(58) Field of Classification Search
    USPC .......... 60/274, 276, 284, 285; 123/491, 123/685, 686, 689; 701/103, 104, 109, 110, 701/113
    See application file for complete search history.

(56) References Cited

U.S. PATENT DOCUMENTS

| | | | |
|---|---|---|---|
| 5,211,011 A | 5/1993 | Nishikawa et al. | |
| 5,353,591 A | 10/1994 | Kabasin et al. | |
| 5,584,176 A * | 12/1996 | Meyer et al. | 60/274 |
| 5,724,808 A * | 3/1998 | Ito et al. | 60/276 |
| 5,762,055 A * | 6/1998 | Yamashita et al. | 123/677 |
| 5,845,492 A | 12/1998 | Isobe et al. | |
| 6,631,611 B2 * | 10/2003 | Shi et al. | 60/285 |
| 6,637,413 B2 * | 10/2003 | Maloney et al. | 123/491 |
| 6,718,755 B2 * | 4/2004 | Brehob | 60/284 |
| 7,155,901 B2 * | 1/2007 | Michelini | 60/298 |
| 7,293,406 B2 * | 11/2007 | Lewis et al. | 60/284 |
| 2002/0104521 A1 * | 8/2002 | Maloney et al. | 123/686 |
| 2002/0112699 A1 * | 8/2002 | Maloney et al. | 123/491 |

FOREIGN PATENT DOCUMENTS

DE    102000614249    10/2007

OTHER PUBLICATIONS

M. J. Anderson A Feedback A/F Control System for Low Emissiion Vehicles. SAE International Congress and Exposition Detroit MI, Mar. 10-5, 1993 pp. 169-184.

* cited by examiner

*Primary Examiner* — Thomas Denion
*Assistant Examiner* — Jorge Leon, Jr.

(57) ABSTRACT

A method for controlling an internal combustion engine wherein, during an initial, relatively low temperature operating phase of the engine, the engine operates with a modulated air/fuel ratio established independently of the operating condition of the engine and wherein, during a subsequent higher temperature operating phase of the engine, the air/fuel ratio is modulated in as a function of the operating conditions of the engine.

23 Claims, 10 Drawing Sheets

US 8,499,546 B2

METHODS FOR REDUCING ENGINE EXHAUST EMISSIONS

TECHNICAL FIELD

This invention relates generally to methods for reducing engine exhaust emissions and more particularly to methods for improving cold start catalyst performance.

BACKGROUND AND SUMMARY

As is known in the art, automotive catalysts have been used for many years to effectively remove pollutants generated by internal combustion engines. One of the key functions of a catalyst is to become active at low temperatures (light-off) in order to quickly control cold engine start-up emissions. Cold-start hydrocarbon (HC) emissions, generated in the first 20 seconds following cold engine start-up, constitute the majority of the HC emissions in vehicle exhaust. Many different technologies have been considered to improve the cold-start performance of catalysts including: Close-Coupled locations (catalyst close to engine), PETA (port exhaust thermactor air—running a vehicle rich and adding air), HC traps, high cell density/low thermal mass catalysts, high PGM loading, zone-coating washcoats, electrically heated catalysts, etc). All the described technologies are associated with increased complexity, cost and/or extra wear on the catalyst. Various vehicle cold-start calibrations and strategies (spark control, air/fuel (A/F) control, charge motion control, VCT, etc.) have also been employed to improve catalyst light-off. Calibration methods for improving catalyst performance can be desirable since they do not introduce additional hardware or much cost to the vehicle. Yet calibration for cold-start emissions performance is limited in that it has to be seamless to the customer, or vehicle operator, and they tend to reduce Nitrogen Oxide ($NO_x$) or HC and Carbon Monoxide (CO) emissions, but not both simultaneously.

The inventors have recognized that one way to improve the cold start performance of a catalyst is by increasing the available energy, or enthalpy entering the catalyst, to improve catalyst light-off. The inventors have discovered that imposing a pre-determined level of A/F modulation during the cold start portion of catalyst evaluation results in increased levels of $H_2$ in the combustion exhaust and significantly lower light-off temperatures for the catalyst, independent of overall A/F. More particularly, the inventors have discovered that the air/fuel ratio modulation produces a relatively greater concentration of $H_2$ in the engine exhaust compared to no modulation independent of the operating condition of the engine, (i.e., during net rich, lean, or stoichometric engine operation). Because $H_2$ is a very reactive component (very low light-off temperature), it accelerates the reaction of other monitored components (HC, CO, NOx) by providing additional heat. Excess $H_2$ can also react with $NO_x$ and $SO_x$ ($H_2 + NO_x \rightarrow H_2O + N_2$) for enhanced LNT or TWC regeneration function.

In accordance with the present invention, a method is provided for controlling an internal combustion engine wherein, during an initial, relatively low temperature operating phase of the engine, the engine operates with a modulated air/fuel ratio established independently of the operating condition of the engine and wherein, during a subsequent higher temperature operating phase of the engine, the air/fuel ratio is modulated in as a function of the operating conditions of the engine.

In one embodiment, the initial, relatively low temperature is before light-off.

In one embodiment, the engine includes a system for determining the air/fuel ratio operating condition of the engine and wherein such modulation is independent of determination during the initial operating phase of the engine and wherein the modulation is a function of such determination during the subsequent operating phase of the engine.

In one embodiment, the engine including a sensor system for producing a signal indicative of an air/fuel ratio operating condition of the engine wherein, during an initial, relatively low temperature operating phase of the engine, the engine operates with a modulated air/fuel ratio established independently of the signal and wherein, during a subsequent higher temperature operating phase of the engine, the air/fuel ratio is modulated in as a function of the signal.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
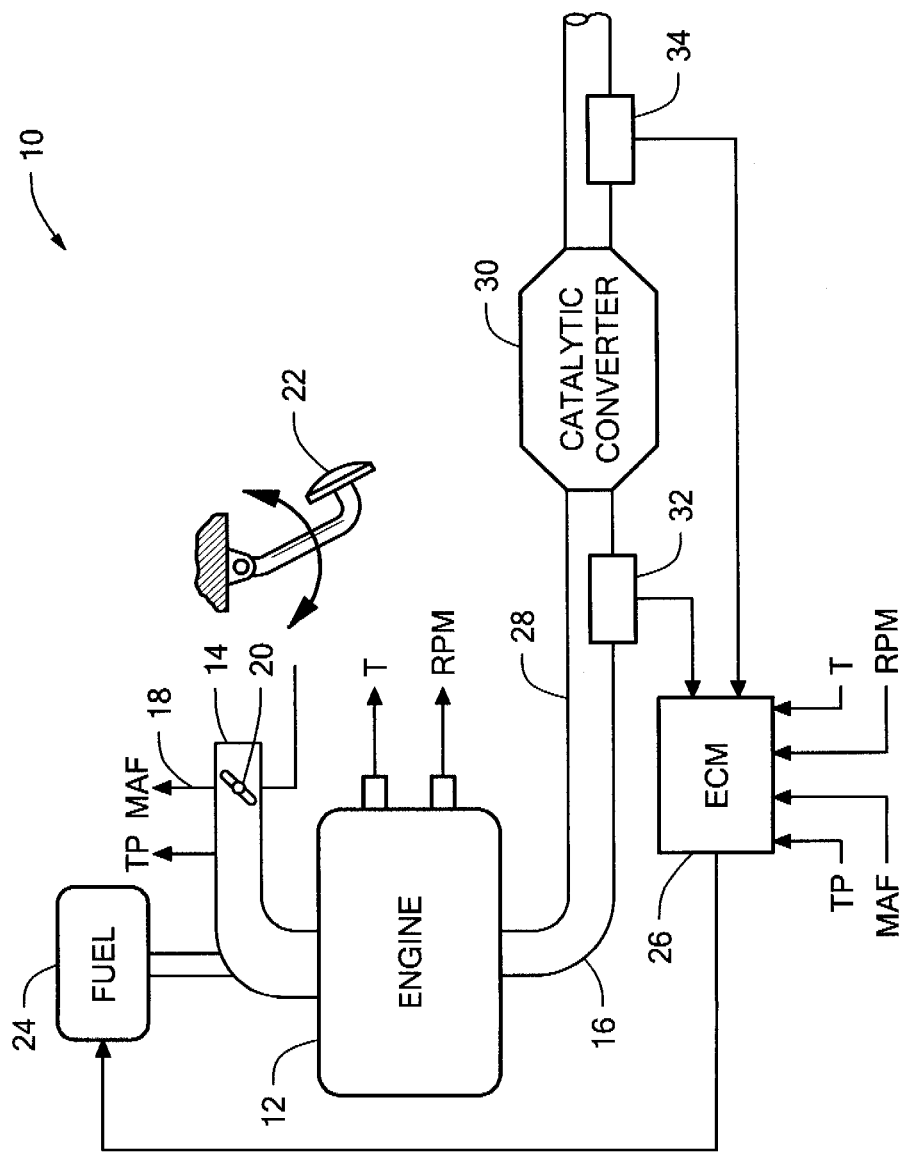
FIG. 1 is a block diagram of an internal combustion engine system according to the invention.

Referring now to FIG. 1, a block diagram of an engine system 10 is shown. System 10 includes an internal combustion engine 12 having an intake manifold 14 and exhaust manifold 16. Airflow through intake manifold 14 is measured by mass air flow (MAF) sensor 18 and regulated by throttle valve 20. A throttle position sensor (TPS) provides a signal indicative of position of throttle valve 20 or an associated accelerator pedal 22. A conventional fuel supply 24 provides fuel which is mixed with the air in intake manifold 14 to provide a combustion mixture which is controlled by an engine controller, such as Engine Control Module (ECM) 26. Of course, ECM 26 may perform control and monitoring functions for various vehicle systems and subsystems in addition to controlling and monitoring engine 12.

An exhaust pipe 28 couples catalytic converter 30, for example a three-way converter (TWC) to the exhaust stream of engine 12. Catalytic converter 30 is monitored via an upstream exhaust gas sensor 32 and a downstream exhaust gas sensor 34 in communication with the engine controller 26. Upstream sensor 32 is interposed engine 12 and catalytic converter 30 whereas downstream sensor 34 is interposed catalytic converter 30 and atmosphere. Upstream (front) sensor 32 is preferably an exhaust gas oxygen sensor, here either a heated exhaust gas oxygen sensor (HEGO) or a universal exhaust gas oxygen sensor (UEGO) provides an indication of the presence or absence of oxygen in the exhaust stream. Downstream (rear) sensor 34 operates in a similar fashion as upstream sensor 32 but is commonly referred to as a catalyst monitor sensor (CMS), here a UEGO sensor, due to its intended function in the exhaust system. Any of a number of exhaust gas sensors may be utilized including lambda sensors, proportional oxygen sensors, and the like.

The ECM 26 includes a microprocessor and various computer readable storage media, which may include but are not limited to a read only memory (ROM), a random access memory (RAM), and a keep-alive memory (KAM). The computer readable storage media may be implemented by any of a number of known volatile and non-volatile storage devices including but not limited to PROM, EPROM, EEPROM, flash memory, and the like, all of which are well known in the art. RAM is typically used for temporary data storage of various operating variables which are lost when the engine ignition is turned off, such as counters, timers, status flags, and the like. KAM is generally used to store learned or adaptive values which may change over time. The contents of KAM are maintained as long as some power is provided to ECM 26. Preferably, one or more ROMs within ECM 26 contains control logic implemented by program instructions executed by the microprocessor along with various system parameter values and calibrations including the method in accordance with the flowchart in FIGS. 2 and 3 to be described in more detail below.

The ECM 26 receives signals from upstream and downstream exhaust gas sensors 32 and 34, respectively, which reflect current operating conditions of engine 12 and catalyst 30. For example, when at or above operating temperature, sensor 32 provides a continuous signal (preferably a voltage) to ECM 26 based on the oxygen in exhaust pipe 28. The voltage signal is indicative of the excursion from the stoichiometric combustion mixture of the exhaust gases in exhaust manifold 16. The UEGO 34 monitors catalytic converter 30 by detecting the oxygen downstream from converter 30 and provides a voltage signal to ECM 26.

Various other sensors communicate with ECM 26 to facilitate control and monitoring functions. Sensors may include a coolant temperature sensor M, engine speed sensor (RPM), throttle position (TP) sensor, mass airflow (MAF) through the intake manifold of the engine, and the like.

The ECM 26 uses control logic implemented in hardware and/or software to generate various signals to control and monitor operation of engine 12. For example, controller 26 generates an output signal to electronic fuel injectors, represented by fuel supply 24, to control the quantity and timing of fuel delivered to engine 12. ECM 26 is also used to monitor performance of catalytic converter 30 using upstream sensor 32 and downstream UEGO 34. The sensor signals are filtered, periodically sampled, and stored within ECM 26 to monitor performance of catalytic converter. Exhaust gas oxygen sensor 16 is coupled to exhaust manifold 48 of engine 10 upstream of catalytic converter 20.

As will be described in more detail below, during an initial, relatively low temperature operating phase of the engine, the engine operates in response to signals from, the ECM to fuel supply 24 to provide an amplitude modulated air/fuel ratio established independently of the operating condition of the engine (i.e., during net rich, lean, or stoichometric engine operation) while during a subsequent higher temperature operating phase of the engine, the air/fuel ratio is amplitude modulated as a function of the operating conditions of the engine; more particularly, controller 12 controls engine air/fuel ratio in response to signals from the upstream sensor 32 and downstream UEGO 34 in any conventional closed loop manner.

One way to improve the cold start performance of a catalyst is by increasing the available energy, or enthalpy entering the catalyst, to improve catalyst light-off. Conservation of energy states that:

Rate of accumulation of heat=rate of heat flow in−rate of heat flow out+rate of heat generation The rate of heat generation was the main focus of the study of the experiments described below (total flow rates and external temperatures were kept constant between runs). The total amount of energy available across a catalyst can be described by the rate of exothermic energy release (or thermal power) $\Delta H_R$. For a catalyst, $\Delta H_R$ is dependant on exhaust gas flow rate, concentration of the exotherm producing components, and ultimately, catalyst conversion efficiency:

$$\Delta H_R = V_{exh} * (C_{fg}^{HC} * \chi_{HC} * \Delta H_{HC}^C + C_{fg}^{CO} * \chi_{CO} * \Delta H_{CO}^C + C_{fg}^{H_2} * \chi_{H_2} * \Delta H_{H_2}^C)$$

$V_{exh}$=Exhaust volumetric flow rate
$\chi$=Catalyst conversion of specified component
$C_{fg}$=Concentration of specified component in exhaust
$\Delta H_c$=Heat of combustion of specified component The pulsator, see J. S. Hepburn, "The Pulse Flame Combustor Revisited", SAE-962118, 1996, used to simulate vehicle light-off conditions in order to determine what control parameters could be adjusted in a vehicle to produce higher levels of exotherm generating reactants. The pulsator ignites a mixture of air and fuel in a combustion chamber which is set at a pre-determined temperature. It also uses computer feedback proportional-integral (PI) control to provide the air/fuel environment requested by the user. The air to fuel ratio (A/F) modulation amplitude, and modulation time (i.e., frequency of the amplitude modulation) can be set by the operator in order to mimic feedback A/F control on the vehicle. It is noted that ($\lambda$=□A/F$_{actual}$/A/F$_{stoich}$). Therefore, amplitude modulation of A/F ratio also is amplitude modulation of $\lambda$.

The exothermic energy available for catalyst light-off can be increased by adjusting simulated vehicle operating conditions in order to produce greater concentrations of exotherm producing reactants, especially hydrogen ($H_2$).

While, as noted above, open-loop control is generally employed during cold-engine start up since A/F sensors require a minimum temperature before becoming energized (Standard gasoline vehicles generally start rich and gradually reach stoichiometric or slightly lean A/F condition without A/F modulation), pulsator testing has shown that imposing a pre-determined level of A/F modulation during the cold start portion of catalyst evaluation results in increased levels of $H_2$ in the combustion exhaust and significantly lower light-off temperatures for the catalyst, independent of overall A/F ratio, as described below.

A/F modulation can change the concentration of combustion products, including HC, CO, $NO_x$ and $H_2$. Increasing A/F modulation, or lambda ($\lambda = \Box A/F_{actual}/A/F_{stoich}$), increased the levels of $H_2$ and CO as shown in Table 1 below, at every lambda ($\lambda$) value. The heats of combustion ($\Delta H_c$) for each component and the sum of the components are also shown in Table 1 below. The negative values indicate exothermic reaction. $NO_x$ was neglected since it contributes only a small amount of energy overall. It's also important to note that the feedgas HC levels did not increase with increased A/F modulation.

availability is not the only emission component that plays a role in cold-start catalyst light-off performance.

Figure 9:
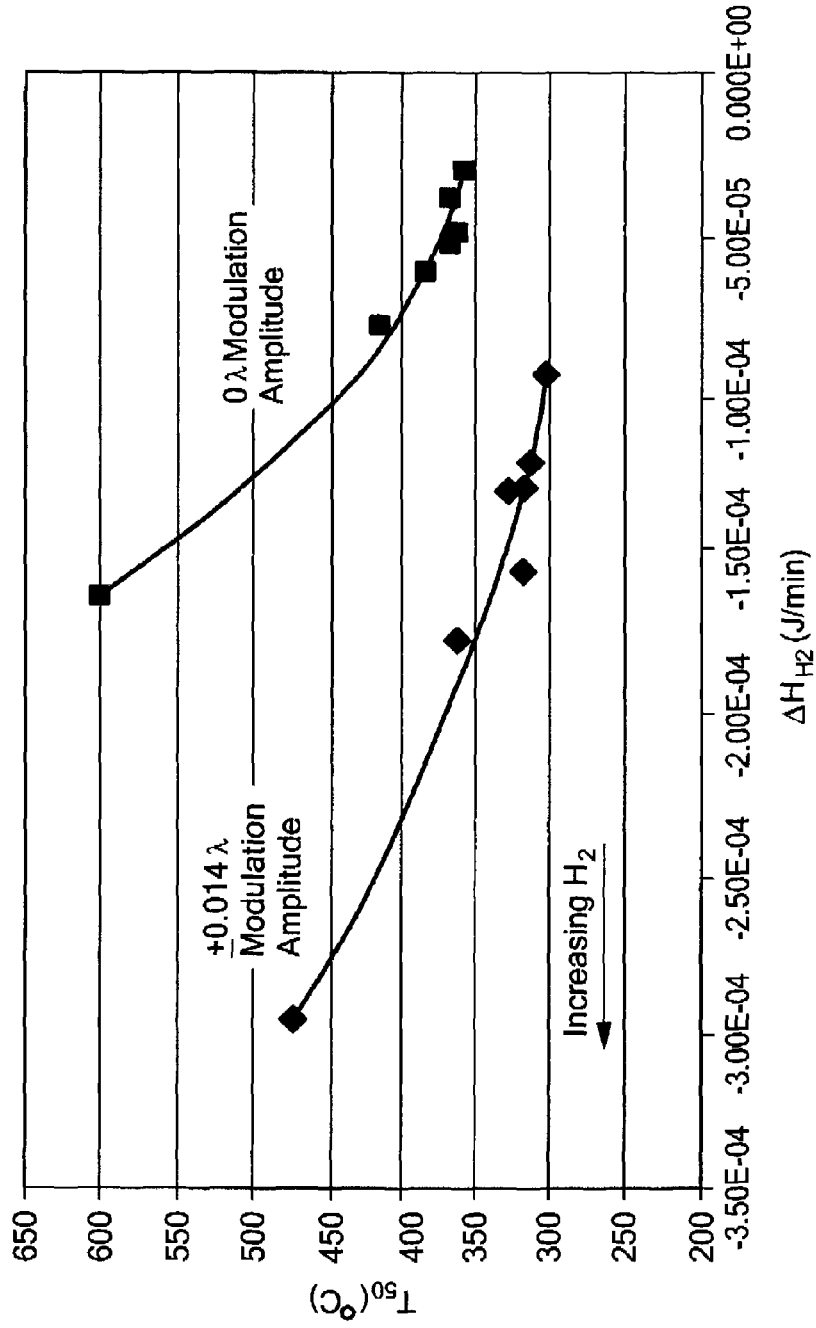
FIG. 9 is a graph showing HC light-off temperature as a function of available $H_2$ enthalpy of combustion at 0 or +/−0.014λ modulation amplitude.

Yet it is important to note that the presence of increased $H_2$ levels improves catalyst light-off performance to an even greater extent in the presence of oxygen (Graph 5: red bars decrease as net $\lambda$ gets leaner). Graph 6 (FIG. 9) below shows the relationship between the heat of combustion generated by the different levels of $H_2$ and $T_{50}$ HC, with or without $\lambda$ modulation. The higher modulation data set is shifted lower (lower light-off temperatures) and to the left portion of the graph. This shift to the left is due to the fact that the pulsator,

TABLE 1

| | | | | | | | Heats of Combustion | | |
| | | | | | | | −3800 | −283 | | |
| $\lambda$ | Modulation Amp (±$\lambda$) | H2 (PPM) | HC (ppm C6) | CO (ppm) | $\Delta$Hc kJ/mol No$x$ (ppm) | | HC (kJ/min) | CO (kJ/min) | −244 H2 (kJ/min) | sum $\Delta H°_R$ (J/min) |
|---|---|---|---|---|---|---|---|---|---|---|
| 0.95 | 0 | 4300 | 740 | 12800 | 540.00 | | −4.39E−04 | −5.66E−04 | −1.64E−04 | −1.17 |
| | 0.014 | 7800 | 674 | 17800 | 560 | | −4.00E−04 | −7.87E−04 | −2.97E−04 | −1.48 |
| 0.98 | 0 | 2100 | 711 | 6400 | 646.00 | | −4.22E−04 | −2.83E−04 | −8.01E−05 | −0.79 |
| | 0.014 | 4700 | 580 | 11600 | 600 | | −3.44E−04 | −5.13E−04 | −1.79E−04 | −1.04 |
| 0.99 | 0 | 1600 | 693 | 4600 | 668.00 | | −4.11E−04 | −2.03E−04 | −6.10E−05 | −0.68 |
| | 0.014 | 4100 | 541 | 11000 | 668 | | −3.21E−04 | −4.86E−04 | −1.56E−04 | −0.96 |
| 0.994 | 0 | 1350 | 646 | 4460 | 670.00 | | −3.84E−04 | −1.97E−04 | −5.15E−05 | −0.63 |
| | 0.014 | 3380 | 497 | 10200 | 640 | | −2.95E−04 | −4.51E−04 | −1.29E−04 | −0.87 |
| 0.998 | 0 | 1300 | 608 | 3820 | 654.00 | | −3.61E−04 | −1.69E−04 | −4.96E−05 | −0.58 |
| | 0.014 | 3300 | 487 | 9800 | 620 | | −2.89E−04 | −4.33E−04 | −1.26E−04 | −0.85 |
| 1.005 | 0 | 1030 | 604 | 3400 | 670.00 | | −3.59E−04 | −1.50E−04 | −3.93E−05 | −0.55 |
| | 0.014 | 3200 | 472 | 9400 | 656 | | −2.80E−04 | −4.16E−04 | −1.22E−04 | −0.82 |
| 1.02 | 0 | 780 | 570 | 2780 | 740.00 | | −3.38E−04 | −1.23E−04 | −2.97E−05 | −0.49 |
| | 0.014 | 2450 | 440 | 7900 | 700 | | −2.61E−04 | −3.49E−04 | −9.34E−05 | −0.70 |

Figure 4:
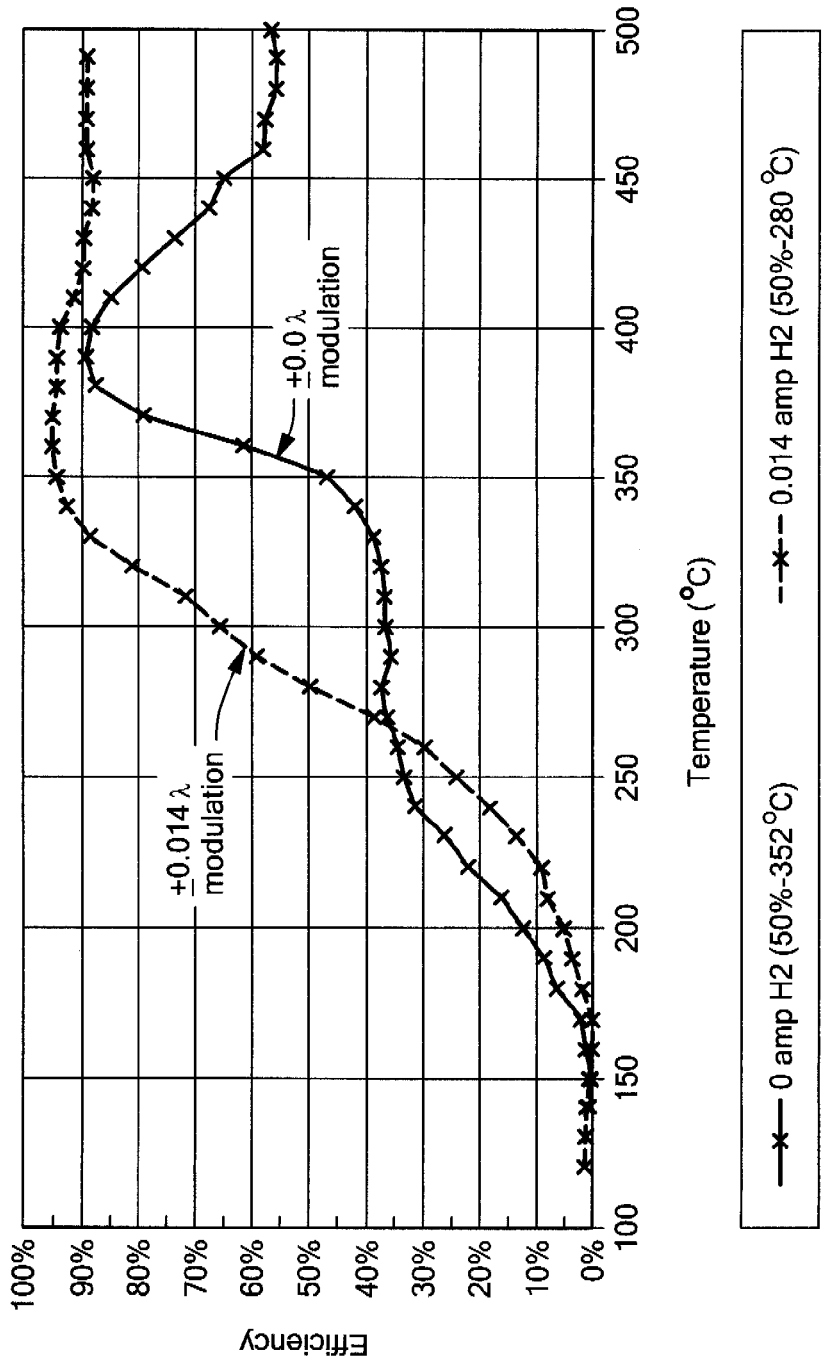
FIG. 4 is a graph showing the impact of A/F ratio modulation on $H_2$ light-off performance at simulated 50K vehicle miles.
Figure 5:
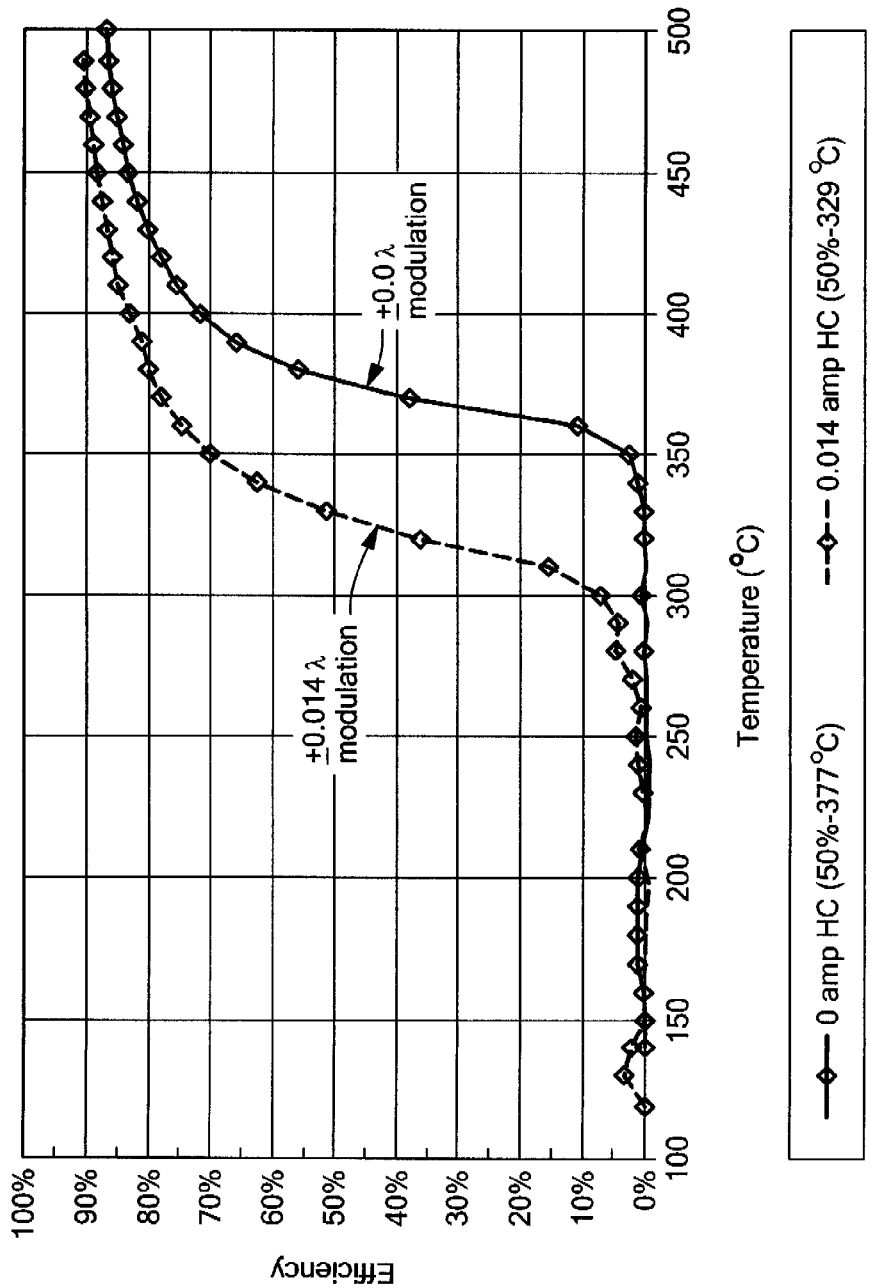
FIG. 5 is a graph showing the impact of A/F ratio modulation on HC light-off performance at simulated 50K vehicle miles.
Figure 6:
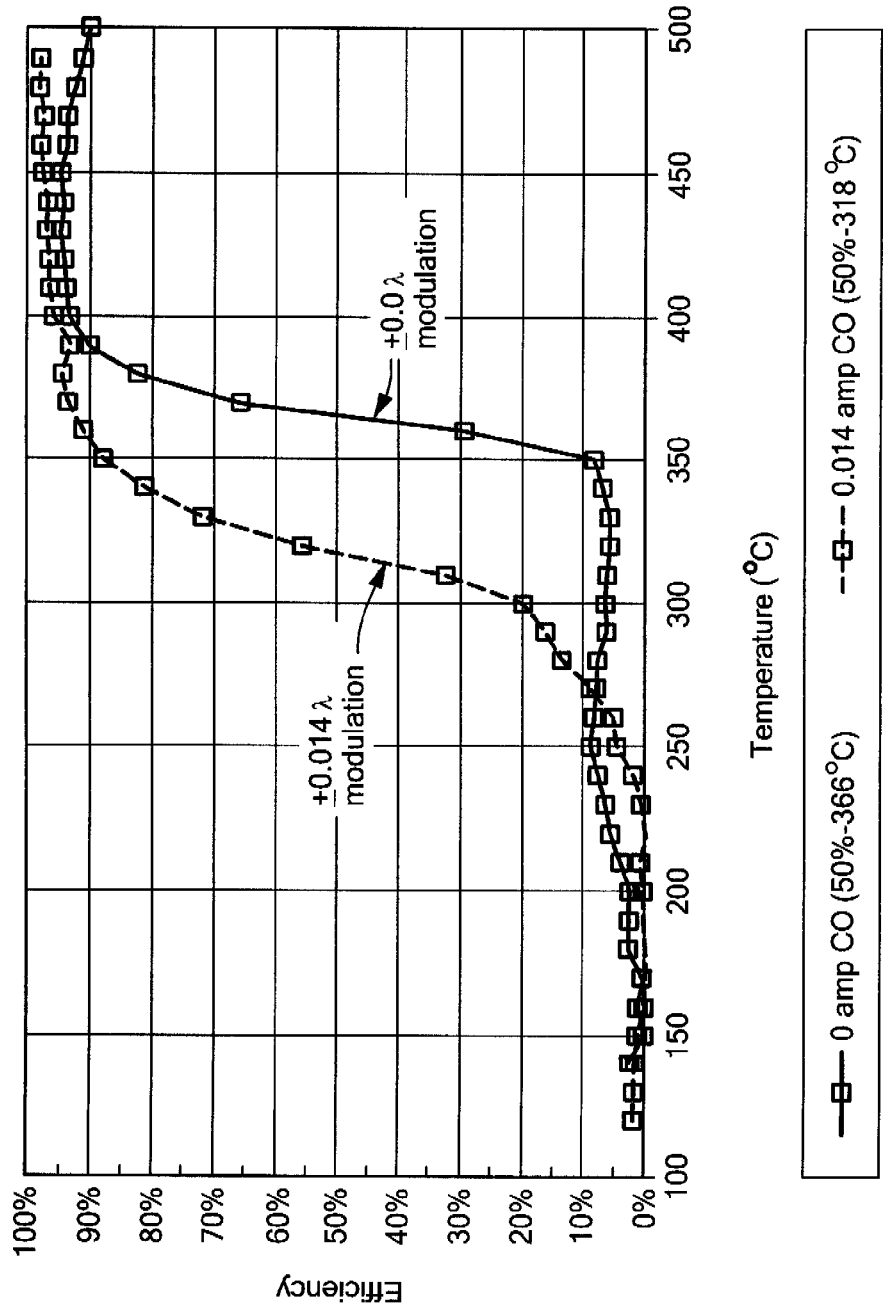
FIG. 6 is a graph showing the impact of A/F ratio modulation on CO light-off performance at simulated 50K vehicle miles.
Figure 7:
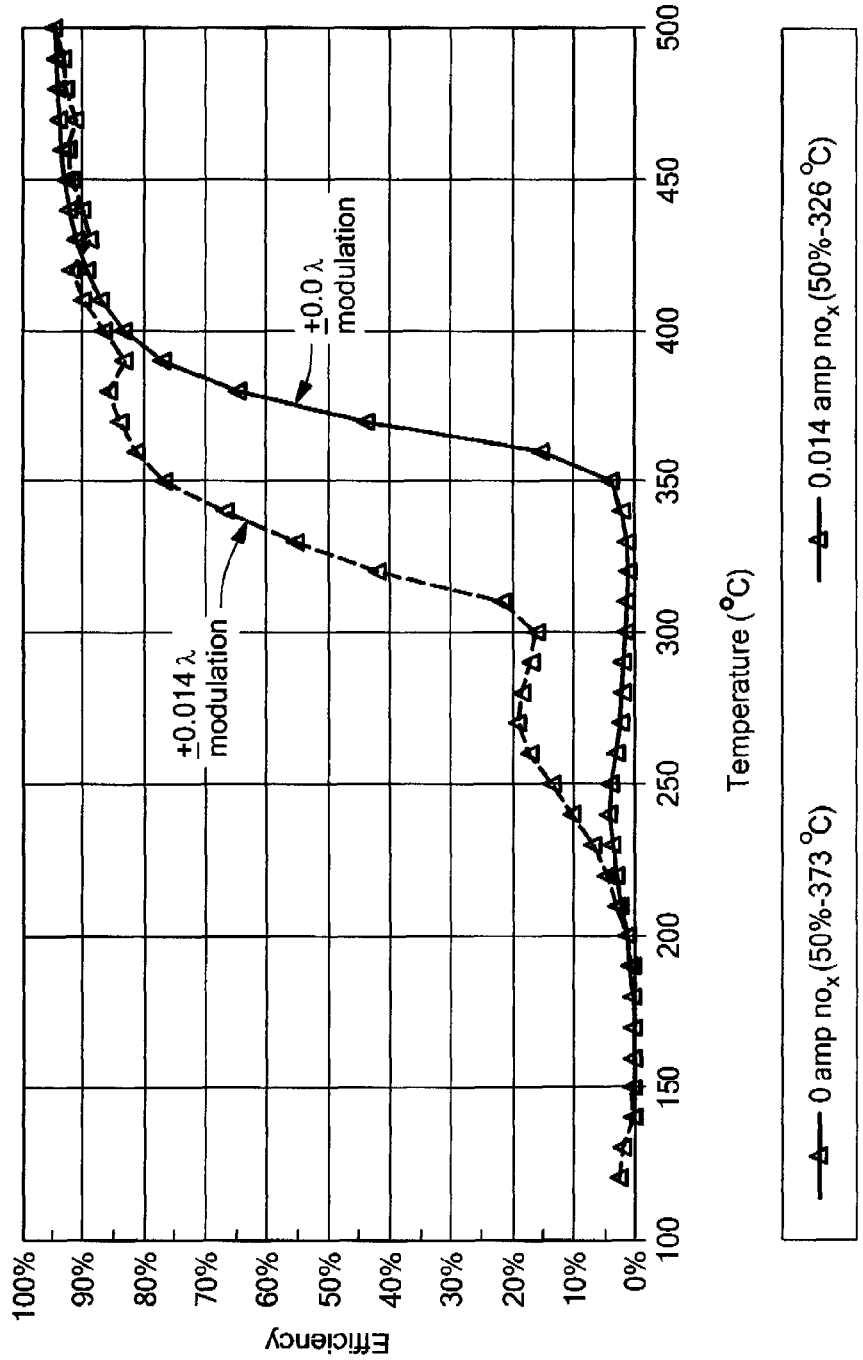
FIG. 7 is a graph showing the impact of A/F ratio modulation on NO light-off performance at simulated 50K vehicle miles.

Increased levels of $H_2$ are shown to enhance the rate of reaction of regulated components (HC, CO and $NO_x$) as shown in graphs 1 (FIG. 4) through 4 below. A conventional 0:9:1/60 g/ft$^3$ 900/2 substrate three-way catalyst (TWC) was tested at an overall lambda setting of 0.994 for these graphs. Graph 1 (FIG. 4) shows that the catalyst exposed to lower $H_2$ containing feedgas actually reaches 30% conversion at a slightly lower temperature than when exposed to feedgas with higher levels of $H_2$. Yet with the imposed $\lambda$ modulation, there is an increased amount of thermal energy available with the 2.5× higher $H_2$ level (3380/1350 at $\lambda$=0.994), which results in lower light-off temperatures for the other monitored components (Graphs 2-4; FIGS. 5-7, respectively).

Figure 8:
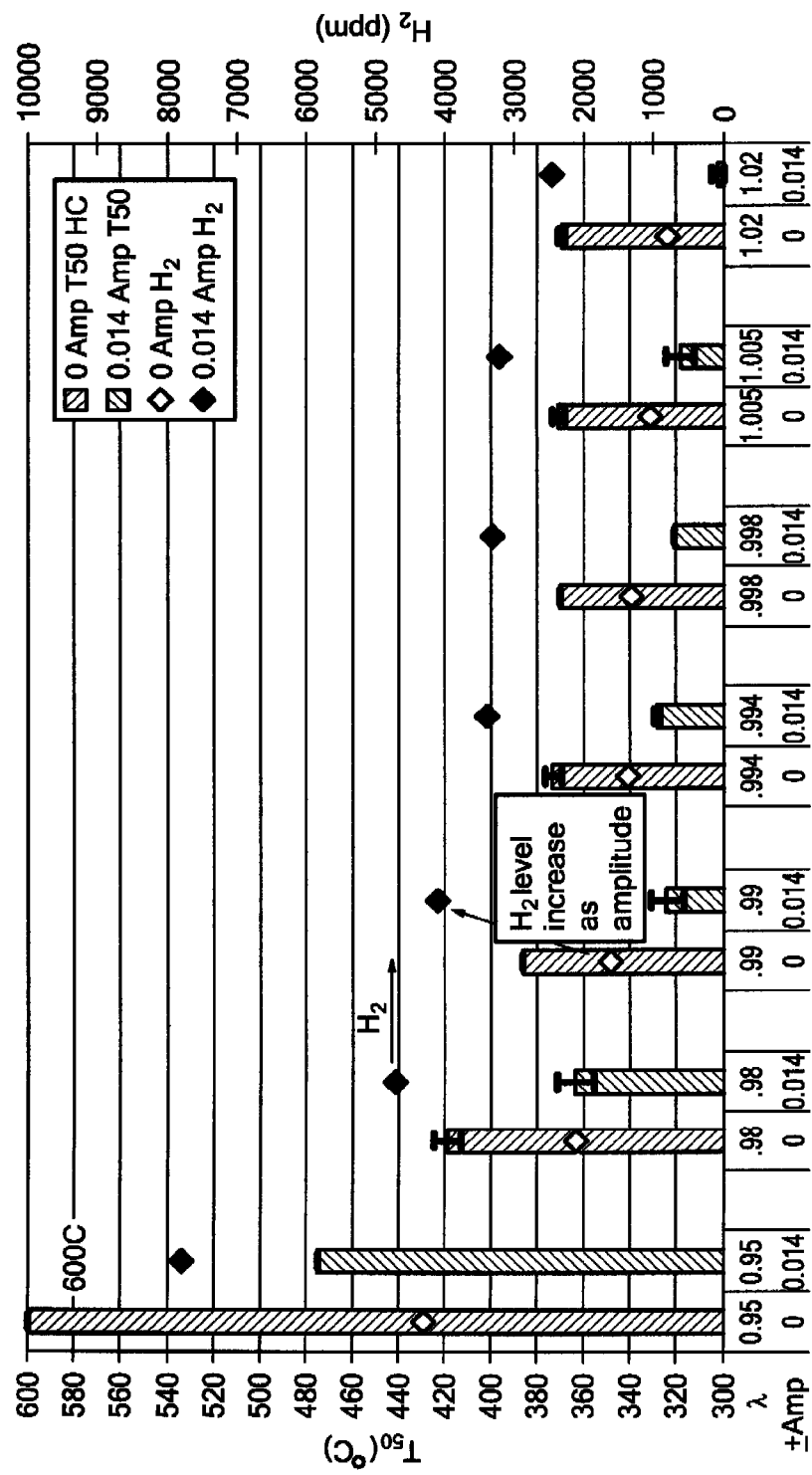
FIG. 8 is a graph showing the impact of A/F modulation and corresponding $H_2$ level on the light-off performance of the catalyst at various operating λ, as measured in terms of $T_{50}$ values (the temperature at which the catalyst converts 50% of the HCs).

Graph 5 (FIG. 8) below summarizes the impact of A/F modulation and corresponding $H_2$ level on the light-off performance of the catalyst at various operating $\lambda$, as measured in terms of $T_{50}$ values (the temperature at which the catalyst converts 50% of the HCs). It is noted that there is a 50° C.-65° C. improvement (i.e., decrease) in catalyst $T_{50}$ hydrocarbon light-off temperature in the range of $\lambda$ 1.02 to 0.98 with an A/F modulation prior to light-off compared an engine operating without A/F modulation prior to light off.

Figure 10:
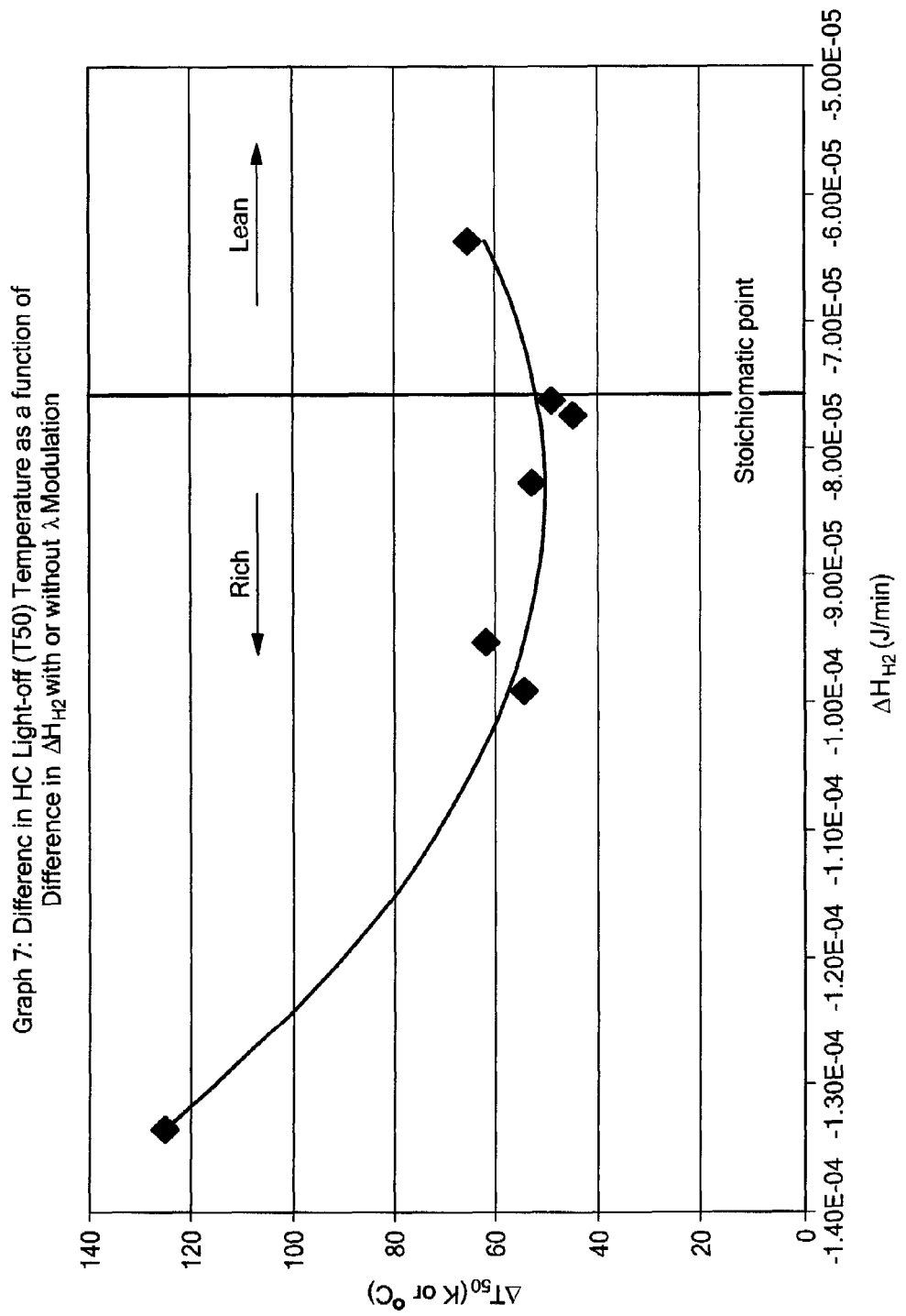
FIG. 10 is a graph showing the difference in HC light-off temperature as a function of the difference in $\Delta H_{H2}$ with or without λ modulation.

Graph 5 (FIG. 8) depicts the important role of $H_2$ in reducing catalyst light-off temperature in a rich environment (since richer exhaust lambda is generally required for good combustion when the engine is cold). If improving or increasing the amount of oxygen available for reaction was the only factor resulting from increasing A/F modulation, then operating net rich with A/F modulation (where maximum modulated lambda level is <1.00) should result in worse light-off performance than operating lean without modulation. Since the light-off performance of the catalyst under modulated conditions at $\lambda$=0.98 (net rich) is similar to the light-off performance of the catalyst during no modulation and lean operating conditions ($\lambda$ of 1.005, 1.02), oxygen concentration and or vehicle, would have to run richer without $\lambda$ modulation in order to generate the same level of $H_2$ as that which is generated during $\lambda$ modulation, yet there wouldn't be as much benefit for light-off due to lack of oxygen available for reaction. Graph 7 (FIG. 10) shows the significance of $H_2$ generated via forced modulation on the rich light-off performance of a conventional TWC.

The data has shown the benefit generating increased levels of $H_2$ via A/F (or $\lambda$) modulation on the light-off performance of a catalyst during cold engine start-up. Specifically:

$H_2$ is the first component to light-off during the light-off test, and accordingly, is the largest contributor to the initial energy available for catalyst light-off Increasing/forcing A/F modulation increases $H_2$ concentration in exhaust Increasing/forcing A/F modulation does not have a large impact on the overall HC or NOx concentration in exhaust (and accordingly, would not increase total mass of HC, NOx generated during combustion)

Increasing A/F modulation improves the light-off performance of the catalyst whether the vehicle is running net rich, stoichiometric, or lean The improvement in catalyst light-off performance is more pronounced during net rich operation than during stoichiometric operation, demonstrating the significance of implementing this process during typical cold-engine start-up (fuel rich conditions-Graph 7).

Imposing A/F modulation during rich cold-engine start-up conditions can produce catalyst light-off performance similar to that which is obtained during stoichiometric or lean ($\lambda$ of 1.02) operating conditions, without A/F modulation.

Imposing an A/F modulation during cold-engine start-up is a technically feasible idea that can be implemented by necessary calibration/strategy updates/modifications (without feedback control necessary). A/F modulation can be achieved by scheduling more/less lost fuel during open and closed loop A/F control via an existing table. Open loop modulation can be imposed by including a calibratable time-dependant/temperature dependant multiplier (K) to lambda (in vehicle cold-start strategy), as described below.

$H_2$ generation strategy for improved cold-start will consist of a pre-determined A/F or lambda trajectory with an imposed modulation for the first 0-60 seconds (variable) following cold engine start-up. Additionally, this modulation will help buffer the engine/exhaust system at cold-start vehicle operating conditions.

Figure 2:
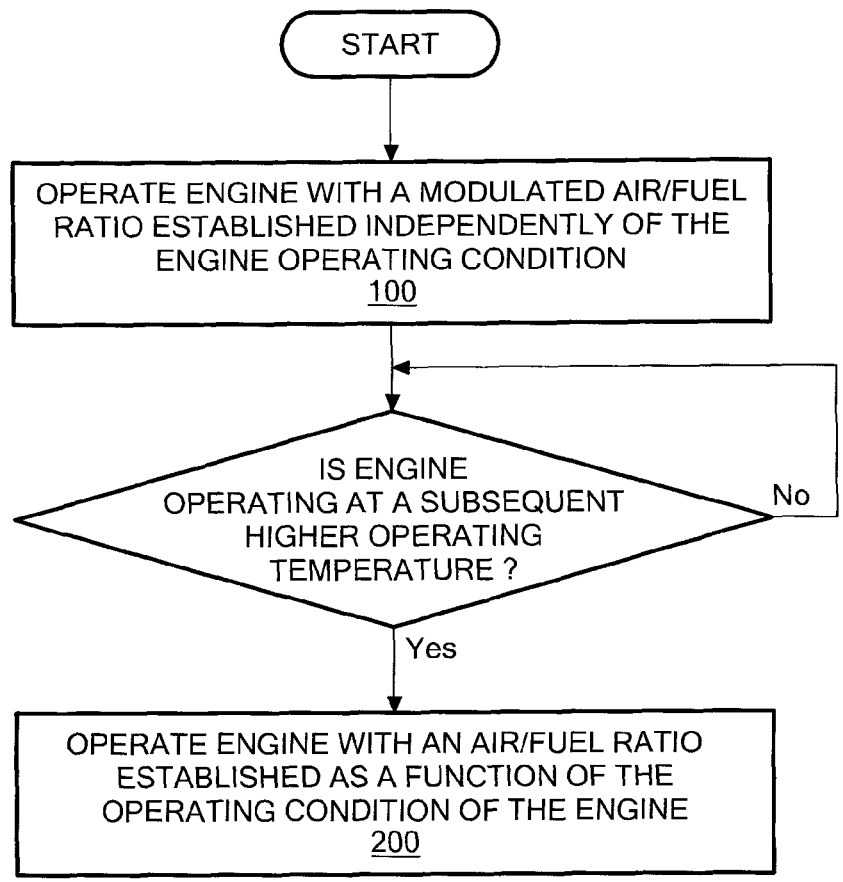
FIG. 2 is an overall flowchart of the process used to control the internal combustion engine of FIG. 1 in accordance with the invention.
Figure 3:
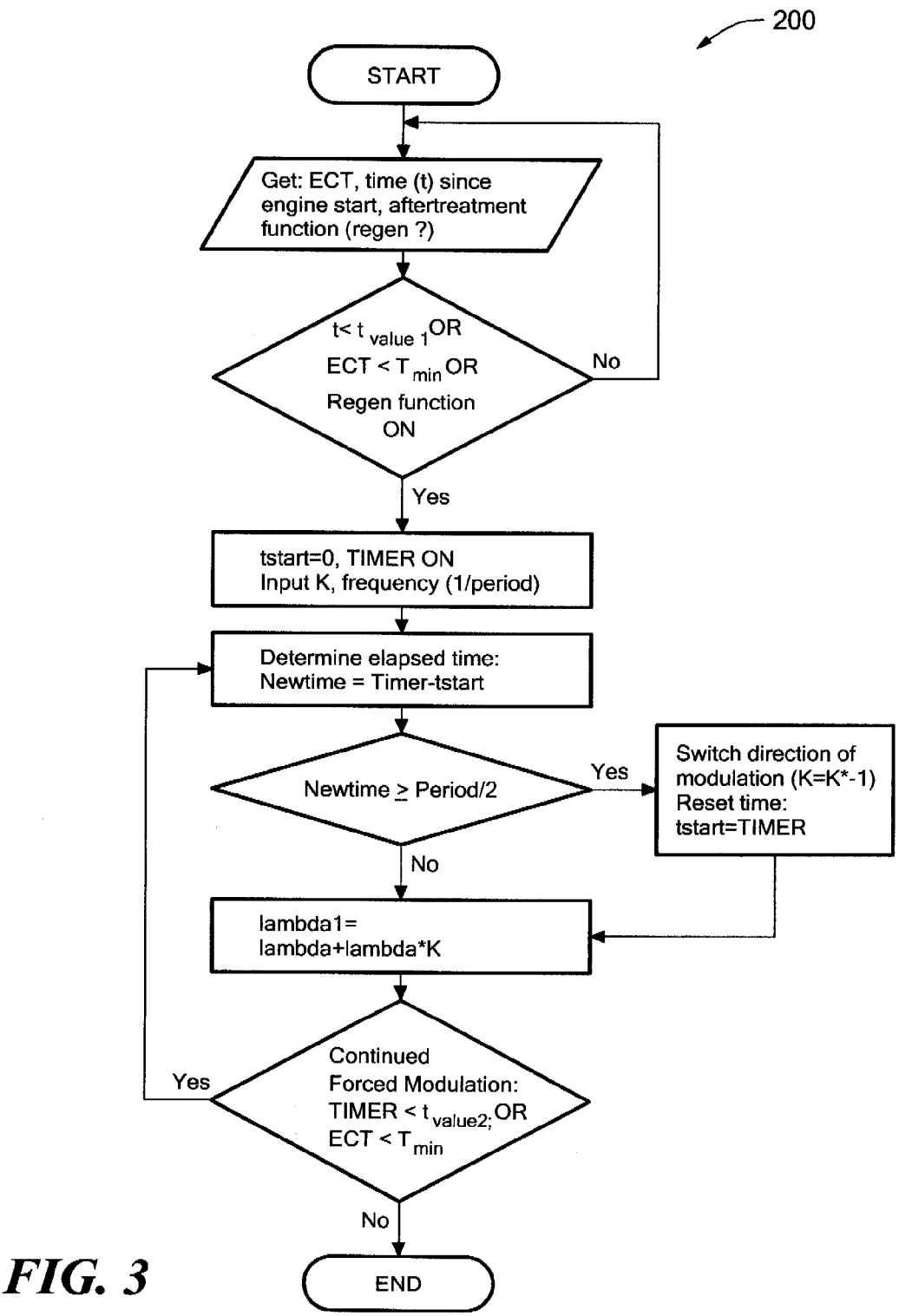
FIG. 3 is a more detailed flowchart of a step used in the method of FIG. 2 in accordance with the invention.

Referring now to FIGS. 2 and 3, an overall flowchart and a more detailed flowchart, respectively, of the open-loop A/F strategy for determining commanded vehicle A/F ratio and hence lambda, λ, value, are shown, where: K=Multiplier; Period=1/frequency; Lambda=vehicle commanded value; and TIMER=time since vehicle start.

Thus, referring to FIG. 2, in process determines whether the engine is in an initial, relatively low temperature operating phase by for example, determining whether the operating time of the engine from initial start is less than a predetermined time or whether the operating temperature of the engine is less than a predetermined operating temperature. If yes, the ECM sends an amplitude modulated signal to the fuel supply 24 to operate the engine with a modulated air/fuel ratio established independently of the actual engine operating A/F ratio (i.e., independent of the signals produced by the UEGOs), STEP 100. Thus, the A/F ratio amplitude modulating (here the signal to the fuel supply) is produced as an open loop signal; i.e., without feedback information from the UEGOs. On the other hand, if it is determined that the engine is now operating at a subsequent higher temperature operating phase, (i.e., the operating time of the engine from initial start is greater than a predetermined time or the operating temperature of the engine is greater than a predetermined operating temperature), the ECM sends a control signals to the fuel supply 24 to operate the engine in accordance with the actual engine operating A/F ratio (i.e., as a function of the signals produced by the UEGOs) (STEP 200). Thus, now the A/F ratio (here the signal to the fuel supply) is produced as a closed loop signal, i.e., with feedback information from the UEGOs More particularly, STEP 100 is shown in more detail in FIG. 3. Thus, after engine start, the time in the ECM is turned on, the constant K (where K is the amplitude of the A/F ratio modulation), and the frequency of the amplitude modulation are input for the ECM processor from the ROM. It is noted that K and frequency are determined during an initial factory-test calibration procedure and are stored in the ROM. The modulation amplitude, K, and period are calibratable parameters that can be adjusted to minimize measured tailpipe emissions (HC, CO, and NOx).

Next, the lapsed time is determined (i.e., Determine elapsed time: Newtime=TIMER−tstart).

If Newtime≧Period/2 and Reset time: tstart=TIMER, (i.e., the operating time of the engine from initial start is greater than one half of the modulation period), the direction, or polarity, of modulation (K=K*−1) is reversed, otherwise, K is not changed.

In either case, lambda1=lambda+lambda*K, and the A/F ratio is thereby amplitude modulated independently of the operating condition of the engine (e.g., independent of the signals produced by the UEGOs).

The process continues until a predetermined time, value (i.e., TIMER<value) after which, the engine operates operate the engine in accordance with the actual engine operating A/R ratio (i.e., as a function of the signals produced by the UEGOs) using any conventional control strategy.

A number of embodiments of the invention have been described. Nevertheless, it will be understood that various modifications may be made without departing from the spirit and scope of the invention. Accordingly, other embodiments are within the scope of the following claims.

What is claimed is:

1. A method for controlling an internal combustion engine, comprising:
   operating the engine with two phases, a first one of the two phases being an initial temperature operating phase of the engine and a second one of the two phases being a subsequent higher temperature operating phase of the engine, wherein,
   during the initial temperature operating phase of the engine;
   operating the engine with an air/fuel ratio varying with a predetermined modulation function F(t), where t is time, having a predetermined period P; and
   determining, after the predetermined period of time P whether:
     (A) operating temperature of the engine is less than a predetermined operating temperature; or
     (B) operating time of the engine is less than a predetermined time and;
   if it is determined that the operating temperature of the engine is less than the predetermined operating temperature or the operating time of the engine is less than the predetermined time, repeating the air/fuel ratio varying with the predetermined modulation function F(t), otherwise proceeding to operate the engine in the second one of the two phases.

2. The method recited in claim 1 wherein the initial temperature operating phase of the engine is before catalyst light-off.

3. The method recited in claim 1 wherein the predetermined modulation function is determined during an initial calibration procedure.

4. The method recited in claim 3 wherein the initial calibration procedure includes measuring tail pipe emissions and adjusting the predetermined modulation function to minimize measured tailpipe emissions.

5. The method recited in claim 1 wherein the predetermined modulation function is amplitude modulated, where a modulation amplitude multiplier, K, has a constant absolute value invariant with engine operating condition and wherein K has a polarity that changes at a predetermined frequency, f, the frequency, f, being invariant with engine operating condition.

6. The method recited in claim 5 wherein the modulation amplitude multiplier, K, and the predetermined frequency, f, are determined prior to operation of the engine and are stored in a memory of a control system used to control the engine.

7. The method recited in claim 5 wherein the predetermined modulation function is determined prior to operation of the engine and is stored in a memory of a control system used to control the engine.

8. The method recited in claim 5 wherein the predetermined period is determined prior to operation of the engine and is stored in a memory of a control system used to control the engine.

9. The method recited in claim 8 wherein the predetermined period does not change during the initial operating phase.

10. The method recited in claim 5 wherein the predetermined modulation function is determined prior to operation of the engine, is stored in a memory of a control system used to control the engine, and wherein the predetermined modulation function does not change during the initial operating phase.

11. The method recited in claim 5 including a timer and wherein the polarity of K changes periodically over time and wherein time is determined by the timer.

12. The method recited in claim 11 wherein the predetermined period is determined prior to operation of the engine and is stored in a memory of a control system used to control the engine.

13. The method recited in claim 12 wherein:
elapsed time from initial engine start is determined; and
if the determined time from initial start is greater than a predetermined fraction of the predetermined period, the polarity of K is reversed, otherwise, K is unchanged.

14. The method recited in claim 1 wherein the predetermined modulation function is at a predetermined frequency.

15. The method recited in claim 1 wherein the predetermined modulation function is performed with the engine operating rich of stoichiometry.

16. The method recited in claim 1 wherein the engine includes a three way catalyst or lean NOx trap.

17. The method recited in claim 1 wherein a 50° C.-65° C. decrease in catalyst light-off temperature results prior to light-off compared an engine operating without air/fuel (A/F) modulation prior to light off.

18. The method recited in claim 17 wherein the predetermined modulation function is determined prior to operation of the engine and is stored in a memory of a control system used to control the engine.

19. The method recited in claim 17, wherein the air/fuel ratio is modulated at a predetermined frequency, f.

20. The method recited in claim 1 wherein an air/fuel ratio modulation amplitude has a predetermined value modulated at a predetermined frequency, f.

21. The method recited in claim 1 wherein the predetermined modulation function is determined prior to operation of the engine and is stored in a memory of a control system used to control the engine.

22. The method recited in claim 1 including a timer and wherein the predetermined modulation function is a function of time provided by the timer.

23. The method recited in claim 1 wherein the predetermined modulation function F(t) includes an amplitude multiplier, K, having a constant absolute value and wherein K has a polarity that changes after a predetermined fraction of the predetermined period P.

* * * * *